Aug. 22, 1944.  C. C. MISFELDT  2,356,338
EXTRUSION MOLDING METHOD
Filed Aug. 11, 1941  6 Sheets-Sheet 1

INVENTOR.
CHARLES C. MISFELDT
BY
Lippincott & Metcalf
ATTORNEYS

Aug. 22, 1944.  C. C. MISFELDT  2,356,338
EXTRUSION MOLDING METHOD
Filed Aug. 11, 1941  6 Sheets-Sheet 2
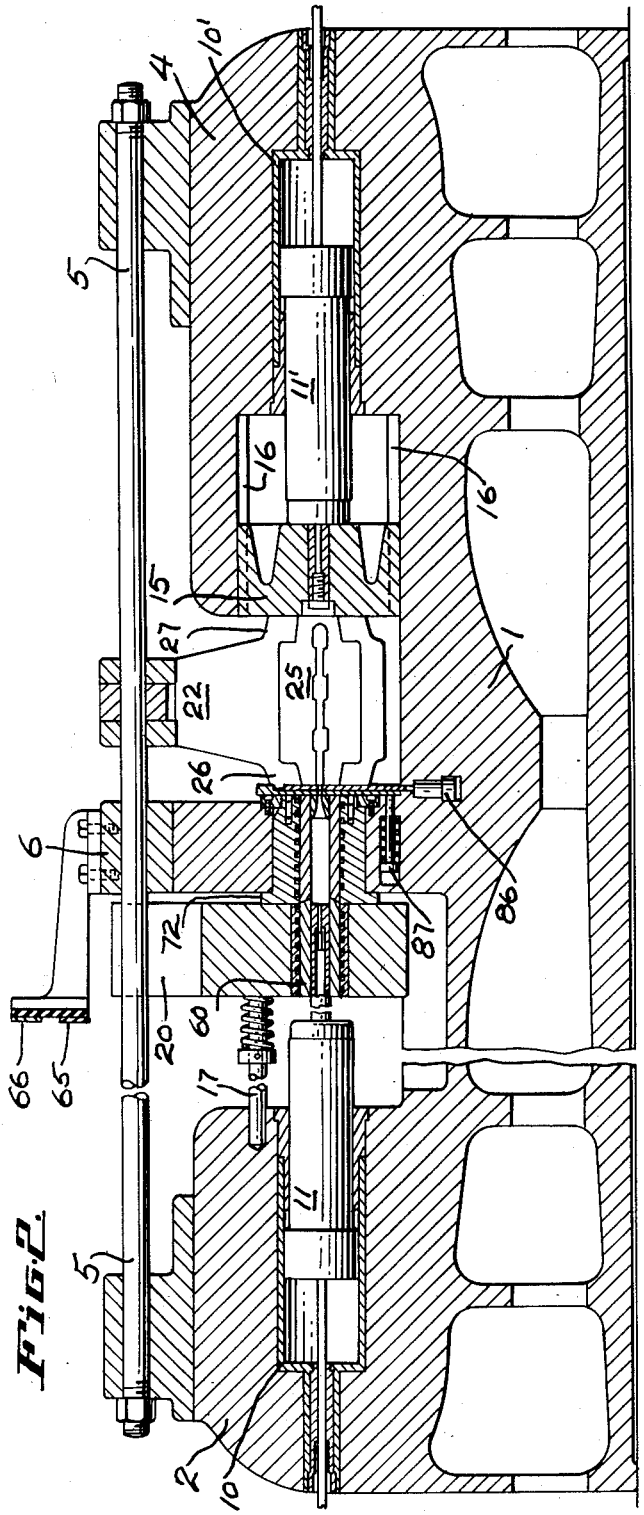
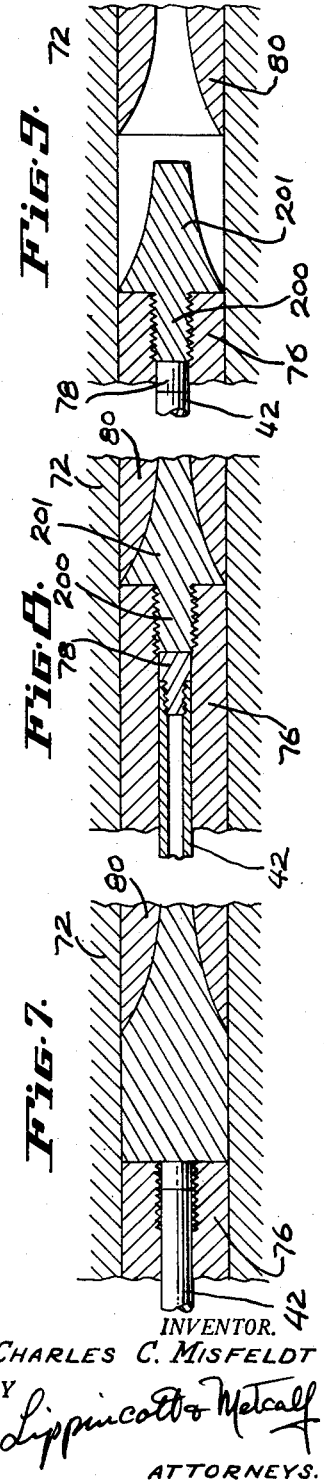
INVENTOR.
CHARLES C. MISFELDT
BY
ATTORNEYS.

INVENTOR.
CHARLES C. MISFELDT
BY Lippincott & Metcalf
ATTORNEYS.

Aug. 22, 1944.  C. C. MISFELDT  2,356,338
EXTRUSION MOLDING METHOD
Filed Aug. 11, 1941  6 Sheets-Sheet 5

INVENTOR.
CHARLES C. MISFELDT
BY
Lippincott + Metcalf
ATTORNEYS.

Aug. 22, 1944.     C. C. MISFELDT     2,356,338
EXTRUSION MOLDING METHOD
Filed Aug. 11, 1941     6 Sheets-Sheet 6
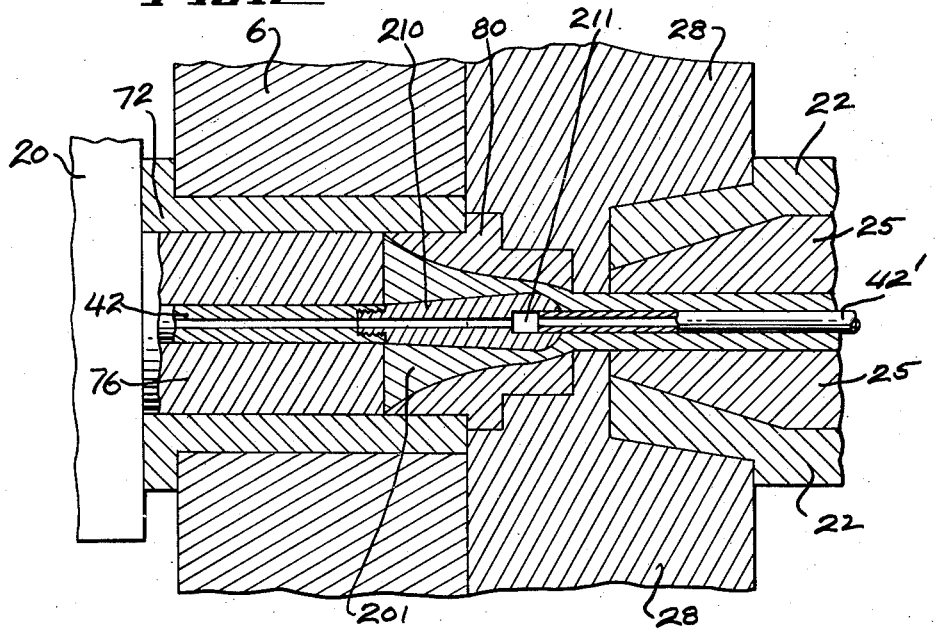
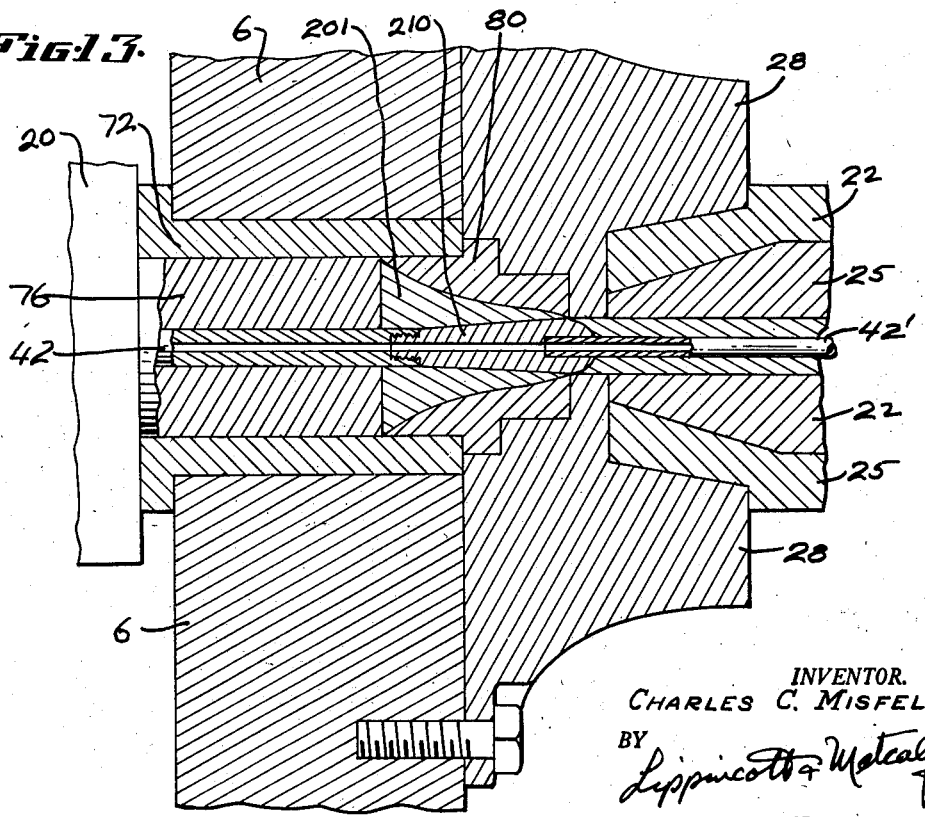
INVENTOR.
CHARLES C. MISFELDT
BY
Lippincott & Metcalf
ATTORNEYS.

Patented Aug. 22, 1944

2,356,338

UNITED STATES PATENT OFFICE 2,356,338

EXTRUSION-MOLDING METHOD

Charles C. Misfeldt, Glendale, Calif.

Application August 11, 1941, Serial No. 406,254

6 Claims. (Cl. 22—200)

My invention relates to method of making extrusion moldings of metal which have many of the characteristics of drop forgings and which are formed by extrusion and molding forces applied to plastic metal. The product of the machine will herein be known as "molded-extrusions" as distinguishing from ordinary extrusions, die castings, drop forgings, or similar products.

Two problems are prominent in the production of die castings having high tensile strength. In die casting, the metal is forced while molten into a mold, through a small gate under pressure, and is held in the mold under relatively low pressure while the metal solidifies, the gate being so small that the pressure is prevented from reaching the mold by metal freezing at the small gate. Great improvements have taken place in the die casting art, but even today great care must be taken to avoid inclusions or gas pockets and shrinkage in the final castings. Also it is difficult to make die castings out of metal so that the final casting will have sufficient tensile strength for many uses for which such castings might be desired. Furthermore, die castings which solidify from the molten state into the solid state while in the mold, have relatively large grain size, and because of porosity and shrinkage subsequent heat treatment cannot be applied without blisters and warping. Such castings still do not have sufficient tensile strength for many uses. Die castings also have large shrinkage factors, both internal and dimensional, and are inclined to grow and warp in use.

Another method of producing an irregular article is by drop forging. The heated metal is placed over a die or between two dies, and then hammered into shape by repeated blows. Such drop forgings have excellent tensile characteristics, but are expensive, as the drop forging procedure does not lend itself readily to high quantity production of the articles, and because there is so much machine work to be done to finish the forged part to accurate dimensions, such a forged article has only a rough finish.

The means and method to be described herein produce a product in a manner only generally similar to the manner of producing die castings. This product, however, when removed from the mold has the general characteristics of a drop forging or an extrusion with related tensile strengths, such characteristics having been imparted to the product by the use of a novel method and machine for making the product, as will hereinafter be apparent.

Therefore, among the objects of my invention are: To provide a means and method of producing parts or articles by extruding and moulding material thereby giving them the characteristics of drop forgings and of wrought material; to provide a means and method of controlling the grain structure of castings; to provide a means and method of producing fine grain pressure molded castings of high tensile strength; to provide a machine for extruding and molding a metal to form a molded extrusion; to provide a molded extrusion which has high tensile and yield strength, and adaptability for uses that cannot be adequately satisfied by die castings or sand castings in the finished or semi-finished condition; to provide a means and method of making a molded article of metal or other material; to provide a means and method of making a pressure forging without repeated blows; to provide a means and method of producing pressure forgings in quantity and with uniformity of grade and to finished dimensions; to provide a process and means for producing extrusions, molded to a combination of contours and shapes; to provide a means and process for producing wrought parts that can be machined without distortion; to provide a method of producing molded extrusions and pressure forgings that can be heat treated without warping and blistering; and to provide a means and process for producing pressure molded castings that can be heat treated without warpage.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way, to the apparatus of the present application as I may adopt various other apparatus embodiments utilizing the method within the scope of the appended claims:

In the drawings:

Fig. 2 is a longitudinal section, partly in elevation, of the machine of Fig. 1.

Figs. 7, 8, and 9 are diagrammatic views showing how the residual metal is removed from the pressure chamber.

Figure 10:

Fig. 10 is a diagram taken from a photomicrograph of the slug material.

Figure 11:
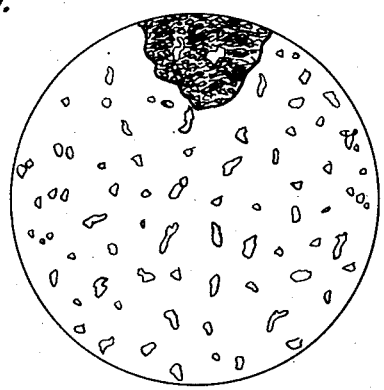

Fig. 11 is a diagram drawn from a photomicrograph of the finished molding.

Figs. 12 and 13 are sectional views of an alternate form of pressure chamber and cutoff mechanism for making hollow moldings, shown in two positions.

Figure 1:
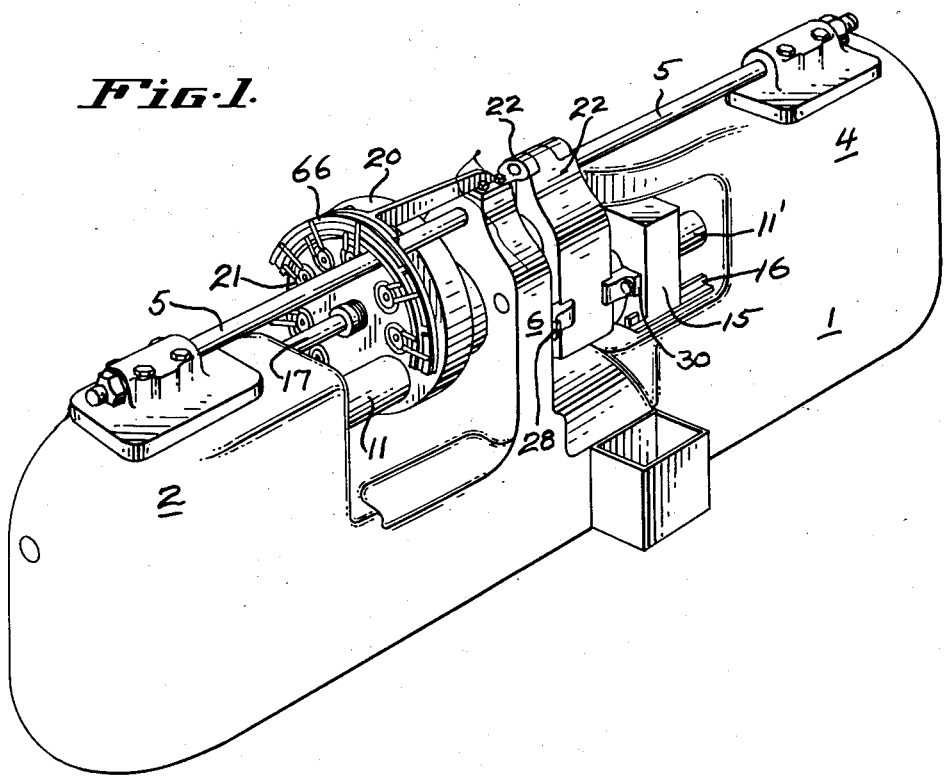
Fig. 1 is a perspective view of the frame and gross assembly of a machine of my invention capable of producing molded extrusions.

Referring to the figures, and particularly to Figs. 1 and 2 for the gross structure of one form of machine capable of performing my method, a base 1 of heavy construction supports, at each end of the machine, cylinder blocks 2 and 4. Cylinder blocks 2 and 4 are tied together across the top of the machine by a tie rod 5 passing through a pressure block 6 rising from the base and positioned between the two cylinder blocks 2 and 4.

In cylinder block 2 is positioned a dual hydraulic cylinder 10 having main piston 11 projecting therefrom and directed toward one side of pressure block 6. In cylinder block 4 a similar cylinder 10' is provided having a main piston 11' projecting therefrom and bearing against a slide block 15 sliding in guideways 16 forming a part of base 1. An axle 17 is provided bridging the gap between cylinder block 2 and pressure block 6, this axle being placed at one side of the center line of the machine and serving to journal a cylindrical barrel 20 having a plurality of slug bores 21 therein. Pressure block 6 is apertured to line with the axis of the main piston 11 for the insertion of a pressure chamber insert, this insert being more fully described later. On the other side of pressure block 6 is positioned a pair of swinging die holders 22, each die holder being laterally rotatable on tie rod 5. Die holders 22 serve to hold die halves 25 laterally, and die holders 22 have angular faced locking lugs 26 and 27 thereon, which engage complementary shoulders 28 on pressure block 6 and movable and complementary locking lugs 30 on the front face of sliding block 15 respectively. These die holders may be heated by coils 23. Lugs 28 and 30 are also heated.

This completes the description of the gross structure as shown in Figs. 1 and 2, and a detailed description of composite hydraulic cylinder 10 only will next be given, it being understood that composite cylinders 10 and 10' are fundamentally identical. The parts of cylinder 10' will hereafter be referred to in prime numbers corresponding to the numbers of the parts of cylinder 10.

Figure 3:
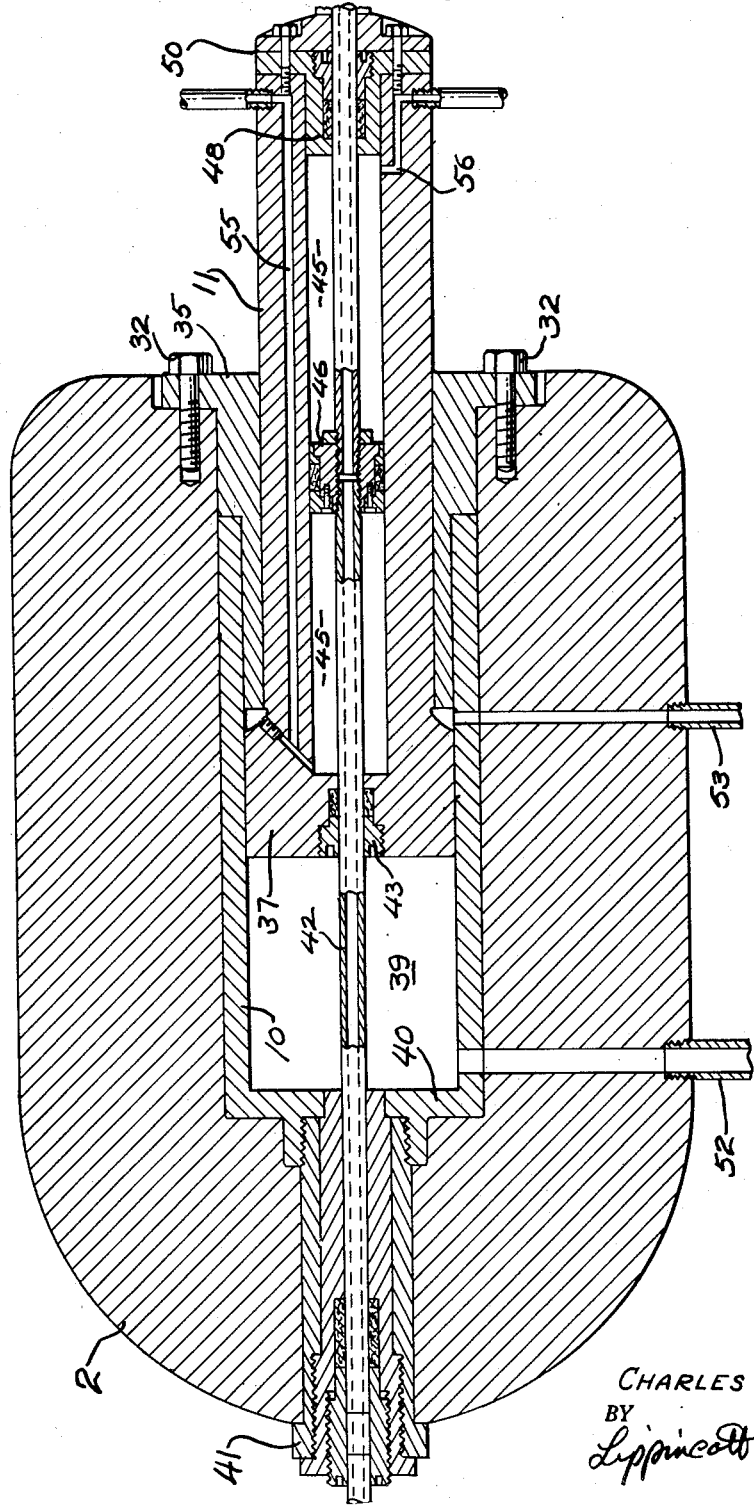
Fig. 3 is a fragmentary horizontal sectional view of part of the machine of Fig. 1 showing the structure of the compound hydraulic cylinders.

In Fig. 3 I have shown in detail composite cylinder 10 as it is seen in horizontal section. Cylinder block 2 is bored out and the cylinder 10 inserted therein and held by bolts 32, this cylinder being provided with an open end bearing 35 accommodating main piston 11. This main piston 11 is provided with a piston head 37 operating in the head space 39 of cylinder 10. The cylinder head 40 of cylinder 10 is provided with a closed end bearing 41, this end bearing fitting a hollow axial rod 42 extending entirely through the piston head 37 in piston head bearing 43, then into a secondary piston chamber 45 in piston 11, there to be attached to a secondary piston 46. Rod 42 is then continued through the remainder of chamber 45, through main piston end bearing 48 to project outside of piston 11 for purposes as will be hereinafter set forth. The front face 50 of piston 11 is so machined as to take various extensions as may be desired, and the inner end of rod 42 is provided with threads 51 as shown in Figs. 7, 8, and 9, so that the inner end may be plugged if desired with a proper tip, or may be left open to carry fluids or tubes, as will be explained later.

The main piston is to be controlled hydraulically, hence piston space 39 is provided with a hydraulic control bore 52 at one end thereof and a smaller bore 53 at the other end, for the passage of a hydraulic fluid such as oil into and out of the head space 39 on each side of piston head 37. Secondary piston chamber 45 is provided with a fluid conduit 55 opening on one side of piston 46 and a fluid conduit 56 opening on the other side of piston 46, these conduits running in main piston 11 and terminating near the end thereof in connections for flexible pipe. The main piston 11 may be progressed hydraulically along cylinder 10 as desired, carrying with it piston 46 and rod 42. At the same time, however, piston 46 may be controlled as to its position within the main piston 11 by hydraulic pressure. Thus I am able to obtain a differential action as between the main piston 11 and the rod 42 for various purposes, as will be described later.

Figure 6:
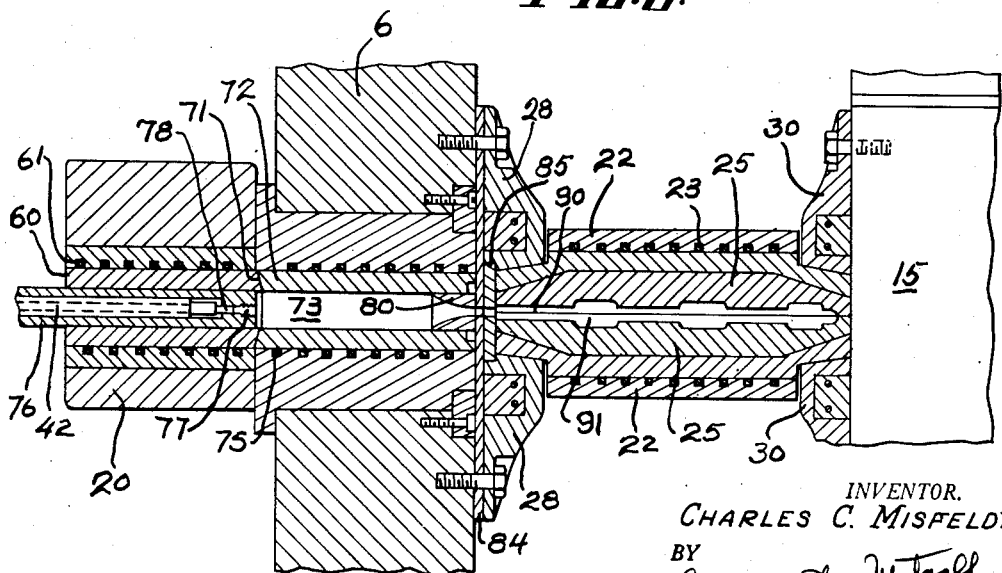
Fig. 6 is a detailed fragmentary view, in horizontal section, of the relationship of the barrel, pressure chamber, and mold of the machine of Figs. 1 and 2.

I will now describe the machine as set up for the making of molded-extrusions, as shown in Figs. 2 and 6, Fig. 6 being an enlargement of the portion of Fig. 3 having to do with the loading and extruding chambers of the device.

Figure 5:
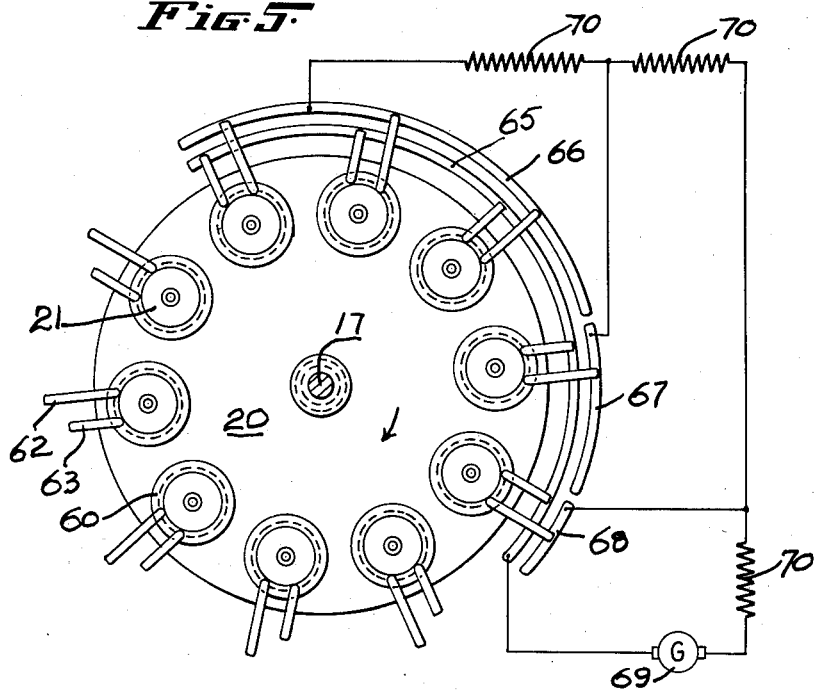
Fig. 5 is a diagram and face view of the barrel of the machine of Fig. 1 showing the circuit for electrical heating of slugs fed into the machine.

As previously described, rotating barrel 20 is provided with a plurality of slug recesses 21. Each slug recess is bored in a slug recess insert 60, each insert being electrically heated by heating coils 61. Each insert is also provided with a long brush 62 and a short brush 63, these brushes forming the termini of the related heating coil 61. The brushes extend outwardly and as the barrel 20 is rotated, the short brush contacts a short brush segment 65, and the long brushes contact, in order, outer segments 66, 67, and 68, as the barrel is rotated clockwise as seen in Fig. 5. By changing the energization of segments 66, 67, and 68 from a power source 69, by the use of resistors 70, the temperature of the slugs when placed in the slug chambers can be accurately controlled during feeding of the slugs. Each insert 60 is provided with a coned end 71 engaging a complementary surface on a pressure insert 72 mounted in pressure blocks 6. This pressure insert 72 is provided with a pressure chamber 73 of the size of the slug chambers 21, and the chambers are coextensive when registered. Pressure insert 72 is also heated by pressure insert heating coil 75.

Slugs are transferred from a slug recess 21 to the pressure recess 73 by extension 76 attached to the outer end 50 of piston 11, this attachment being hollow for the passage of rod 42, and provided also with a restricted aperture 77 on the end thereof, through which a plug projection 78 may pass, this plug projection being screwed in the end of rod 42. The outlet end of pressure chamber 73 is provided with a throat 80 of generally Venturi shape, the small end of throat 80 registering, under normal conditions, with cutoff apertures in cutoff plates 83 and 85, these apertures normally being alined with the small end of throat 80, one of these cutoff plates 85 being vertically movable by a hydraulic cylinder system 86 as shown in Fig. 2. Plate 85 may be moved downwardly so that aperture 82 will register with a knockout piston 87 operating in knockout cylinder 88 hydraulically controlled. Die plates 25 are made to have an inlet opening 90 registering with the apertures in the cutoff plates so that metal passing through throat 80 will flow into die space 91.

Figure 4:
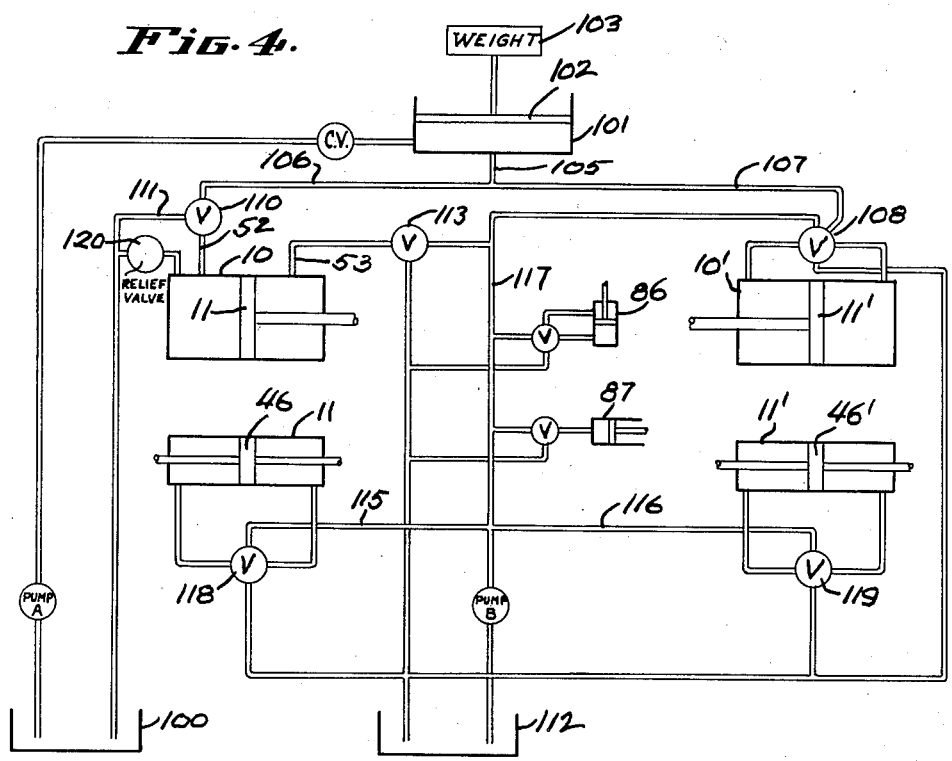
Fig. 4 is a diagram showing the hydraulic operating circuit for the machine of Fig. 1.

Referring now to Fig. 4 for a description of the hydraulic control for my device. In this figure which is diagrammatic only the auxiliary pistons 46 and 46' have been shown as separated from the main pistons 11 and 11' for clarity of illustration. A main tank 100 is provided with a main pump A, pumping hydraulic fluid such as oil into an accumulator cylinder 101. The accumulator cylinder carries an accumulator piston 102 which, when moved upwardly by oil in cylinder 101, moves a weight 103 upwardly and thus oil under pressure is accumulated in cylinder 101. Cylinder 101 discharges into a main line 105 which is divided into a main pressure line 106 for the cylinder 10 entering through bore 52, and a backup line 107 for protecting valve 108 used to control cylinder 10'. Pressure line 106 is under the control of a main valve 110 and a main sump line 111 leads from valve 110 back to main tank 100.

Inasmuch as I may not desire to utilize the high pressure fluid for preliminary movements of the pistons, I provide an auxiliary control system comprising pump B pumping fluid from an auxiliary tank 112 through control lines 115, 116, and 117.

Pressure from line 117 is led through valve 113 to bore 53 in cylinder 10, and also through protected valve 108 to either side of piston 11', as desired. Thus piston 11 may have accumulator pressure on one side thereof and control pressure from pump B on the other side, whereas piston 11' uses only pump B pressure for movement thereof. However, piston 11' may be controlled by the accumulator if desirable.

The auxiliary pistons 46 and 46' are controlled by auxiliary valves 118 and 119 respectively under pressure connected to lines 115 and 116. All valves have sump returns so that when one side of the pistons is placed under pressure the other side will drain into the sump.

The head end of cylinder 10, which is subject to the direct pressure from accumulator cylinder 101, is provided with a relief valve 120 so that the pressure applied to piston 11 can be regulated for extrusion of different materials without changing the constants of the accumulator. Line 117 also supplies cutoff cylinder 86 and knockout cylinder 87 under the valve control.

It will be obvious from the brief description given of the hydraulic system that many of the control valves may, if desired, be interlinked and operated manually or automatically to follow a predetermined cycle.

Having thus described how the pistons may be operated I will now proceed to describe the operation of the machine as set up for making a simple molded-extrusion without a central aperture. In this case the die blocks 25 are placed together after a molded-extrusion has been discharged, and enclosed by die holders 22. In order that these die holders be free to discharge the previous forging, sliding block 15 has been retracted by operation of main piston 11', and the die holders 22 have been moved along tie rod 5 to free locking lugs 26 and 27 from shoulders 28 and 30. After the die is closed and the die holders closed thereon, sliding block 15 is then moved toward pressure block 6 by the use of valve 108 until the die holders 22 are firmly locked in position, with the opening of the die adjacent to the openings in cutoff plates 81 and 82. The latter have been moved to register by the use of hydraulic cylinder 86 which is also operated from auxiliary pump B. Valve 108 is closed, thus providing a hydraulic lock for piston 11'. The slug recesses are loaded and the barrel is rotated with the slugs in recesses 21 being heated electrically as the barrel is rotated with a final and high heat just prior to the rotation of the brushes off of segments 65 and 68, so the the preheated slug may then be brought into registry with pressure chamber 73. At this time the main piston 11 is operated by use of valve 110 to force the preheated slug out of the slug recess 21 into pressure chamber 73 and through throat 80.

However, the preheating of the slug which has taken place in barrel 20 and the heating which is also occurring in the pressure chamber 73 is not necessarily sufficiently high to bring the slug into either a mushy or molten condition. When, however, the solid slug is forced against throat 80, heat is developed at this point. This additional heat is sufficient to reduce the end of the slug in the throat to a mushy or plastic condition so that the metal will flow in a mushy, thick condition through the registering openings into the die cavity. The shape of the throat 80 may be so regulated and designed that the heat developed at that point will never be sufficient to bring the metal into a true molten condition, but only enough to maintain the metal sufficiently plastic to pass through the openings into the die cavities and under sufficient pressure to be in solid solution. A variation in the ratio between the orifice and the piston diameter will regulate the grain size and temperature of the mushy material extruded into the cavity of the mold, to be upset therein.

As the main piston 11 through extension 76 is forcing the mushy slug material into the die cavity the accumulator weight 103 is, of course, falling and exerting high pressure on the face of extension 76. As can be seen in Fig. 7, the interior piston 46 may be operated during the progression of the main piston to bring tip 78 mounted on rod 42 flush with the face of piston extension 76 so that as the extension 76 moves to force the slug out of the pressure chamber, the extension has in effect a flat face presented to the slug. However, just as the extension 76 reaches its final position, registering with the beginning of throat 80 as shown in Fig. 8, rod 42 may be retracted so that a portion of the slug metal (plastic at this point) enters the hollow end of extension 76 to form a residual metal stem 200 which will remain attached to residual metal 201 which will remain in throat 80.

However, as the main piston travels forward and reaches the end of its stroke, the die cavity 91 will become full. Consequently no more mushy metal may be forced through throat 80 into the die cavity. Accumulator weight 103 has of course been falling during the progression of the slug metal through the throat 80, and as the die cavity becomes full, the energy of weight 103 is expended on the metal in the die, with a final high pressure as may be regulated by weight 103, by the relative sizes of the various pistons, by the distance through which weight 103 falls, or by any setting of relief valve 120. At the same time the die blocks 25 are being heated by electrical coils 23 in the die holders, so that the metal in the die blocks, after extrusion and at the time of the application of the extreme high pressure from accumulator 103, can be held at any temperature desired. I prefer to control this temperature so that just as the metal is about to solidify in the die cavity 91, the high pressure be applied. The sudden application of the extremely high pressure from the accumulator, together with the working of the metal in the throat 80, completely changes the character of the extruded material, and makes the grain structure much more comparable to a forging than to a casting, as will be explained more in detail later.

It will be noted that while the high pressure is applied only by piston 11, this pressure, through the die blocks, is also applied to sliding block 15 and piston 11'. This piston being under a hydraulic lock by closure of valve 108, piston 11' therefore exerts a high pressure on valve 108, and to safeguard this valve, I apply through line 107 the pressure of the accumulator to prevent valve breakdown and to balance the valve elements during the application of high pressure thereto.

As the metal in the die cavity 91 is chilling, and while the throat metal is still plastic, plate 82 is moved downwardly by action of hydraulic cylinder 86, thus cutting the metal between the die cavity and the throat 80 and bringing the cutout portion in aperture 82 opposite piston 87 which may then be operated to knock out the separated portion. This cutoff frees the metal in the die cavity 91 from the residual metal 200 and 201 left in the pressure cavity. Pressure may then be released from both cylinders and the piston 11' may then be operated to retract sliding block 15 to allow the completed chilled molded-extrusion, or forging, to be taken out of the die cavity. At the same time the piston 11 is retracted carrying with it the residual metal 200 and 201 as shown in Fig. 9. The portion 200 has, of course, been molded into threaded engagement with the threaded end of piston extension 76 and this threaded engagement is sufficient to break loose the portion 201 from its throat engagement as the extension is retracted. After the piston extension 76 has been retracted sufficiently to bring the portions 200 and 201 out into the open on the cylinder 10 side of barrel 20, the portions 200 and 201 are unscrewed from the end of the piston extension. However, each slug may hold enough metal to make many parts. Also, some metals permit the re-use of residual metal by leaving it in the chambers and extruding it on the next cycle through the orifice into the mold. Thus a perfect homogeneous joint is the result.

When the slug metal is used up, barrel 20 is then indexed to bring the next pre-heated slug again into registry, the die reassembled, placed in position, and the cycle repeated.

When the extruded, refined and mushy plastic material moves from the reducing orifice into the cavity of the mold, it moves to the opposite end of the cavity and is upset there. In other words, the metal actually changes shape at the far end of the mold and is formed until its diameter and shape is telescoped to fit the exact shape of the cavity. This change in shape is important because it provides a definite further working of the metal inside of the cavity during filling thereof, this working taking place while the temperature is being reduced by chilling of the metal.

The grain is then further worked by the impact pressure and the end result is a fine grained article.

Because the mushy material going into the mold is solid and viscous it expels the air in the mold very much like a piston pushes oil out of a cylinder. Porosity cannot occur under these conditions. The metal is not broken up or sprayed, as it might be if liquid were to be forced in quickly. The air is therefore pushed out of the mold without mixing with the incoming metal in any manner.

I have found, for example, using slugs of beryllium copper, that by using a 5 second extrusion time with 60,000 pounds extrusion pressure and a final forging pressure of from 200,000 to 225,000 pounds per square inch, molded-extrusions can be made which have many of the desirable characteristics of drop forgings, and which are in no way comparable to die castings made of the same material in the usual manner, but which compare in physical properties to the same metal extruded in continuous pieces by the cold extrusion method common to the industry.

The process as thus described, and the product which is produced, differ radically from die casting, although it will be obvious by inspection of the machine that pressure-mold casting from molten or mushy metal can be accomplished when temperatures and pressure are adjusted for such castings, and even in this case a final forging pressure greatly improves the casting. The machine will handle materials which do not die cast readily, but which can be pre-heated and thereafter extruded in plastic mushy form into the die to a desired shape in a single operation.

The change in the grain structure is diagrammatically represented in Figs. 10 and 11. Fig. 10 is taken from a photomicrograph of the cast slug material before it has been passed through the machine, and Fig. 11 is a representation of the same material as it appears under the microscope after having been fabricated into a molded-extrusion after the method just above described. It can readily be seen that the grain structure has completely changed and that the grain of the final product is extremely fine and uniform, giving characteristics to the product which is much more like a drop forging or cold extrusion than like a casting.

The increase in the temperature caused by the working due to increasing pressure in the throat, does not cause oxides and has a tendency towards closer wedding of grain structure while the metal is being reduced in diameter by extrusion.

Barrel 20, which holds the metal slugs before they are passed into the machine may, of course, be automatically indexed. During the regular cycle of operation of the machine, this barrel will preheat each slug to exactly the same temperature. The function of the preheating cycle, however, is not merely the preparation of the slug material for presentation to the pressure chamber 73 in order that the time of stay in pressure chamber 73 may be reduced. It is also for the purpose of giving the slugs a heat treatment which may, if desired, be of even higher temperature than the temperature of the slug when it is being forced through the pressure chamber. The preheating of the slugs therefore is important in determining the type of grain structure which is attained in the final forging. The complete cycle therefore includes preheating of the slugs to definite temperatures in accordance with the type of alloy or metal being extruded, a conversion into a flowable mushy plastic because of extreme high pressure, and a final chilling in the die cavity, this latter change of temperature serving as a quench. Inasmuch as the metal before quenching is plactic, accurate control of the proper temperatures can be obtained by pressure regulation, without the use of thermometers. The proper quenching temperatures can be established by adjustment for any of the alloys used in the preheating stage, and by changing the shape and size of the throat 80 to give the required plasticizing temperature. The temperature of the mold can be controlled and changed as desired by heating and cooling of the mold parts.

It should also be noted that the working and compressing of the metal in the mold before chilling or quenching completely eliminates warping of the final forging. The high pressure applied to the metal in the die works the metal right up to the point of freezing. This eliminates the need for shrinkage allowances in machining the cavity in the die. The metal is always under enough pressure while it is chilling to overcome this very usual fault of the common die-casting procedures. Thus, my method and machine permit very accurate parts to be molded to the very closest tolerances. The treatment is also extremely uniform because the operation of the machine can be made wholly automatic in operation, and be made to operate under a regular cycle. Furthermore, parts made by my process, as described herein, may be heat-treated without substantial distortion.

In Figs. 12 and 13 is shown diagrammatically a modification of my invention for use in making hollow forgings. In this case hollow rod 42' of piston 11 is projected through the sliding block 15, through the die block and the die space 91 to form a core or mandrel therein. In this respect it will be noted that the die and mandrel arrangement so set up is ideally adapted for the production of tubing or, by using a die properly cut, for the production of rifle barrels, for example. In this case a hollow slug is used and the end of rod 42 of piston 11 is provided with a hollow swollen tip 210, and cutoff plates 84 and 85 are removed. Tip 210 passes through the center of the slug and has an end recess 211 therein registering with the end of hollow tube 42' of piston 11'. As no cutoff plates 83 or 85 are used, and while the metal is still in plastic condition, rod 42 is progressed toward the small end of the throat to pinch off the metal, leaving the die metal completely free from the residual metal 201 in the throat 80. Inasmuch as the end of tip 210 is larger than the diameter of rod 42, the throat metal will be retracted with the retraction of the piston extension 76, thus freeing the forging and providing a means for removing the throat metal. The tip 210 may then be unscrewed from rod 42 and the metal 201 removed. However, the arrangement shown in Fig. 12 does more than just cut off the throat metal from the die metal, because the end of rod 42' is maintained in exactly central relationship in the die during the solidifying of the die metal. The end of tip 210 also serves to evenly divide the metal flow as the plastic material passes into the die. It should also be noted that in this case the hollow portions of rods 42 and 42' are connected together, and the conduit thus formed may be utilized to carry air or liquid through the die and throat material so that it may be rapidly cooled or quenched after the final impact and setting has taken place.

The device, therefore, as just described may be utilized for making long tubular materials and is, as stated above, ideally satisfactory for the production of rifle barrels, together with all exterior conformations thereof, all in one piece. I have found that beryllium-copper rifle barrels may be formed in this manner, which require very little finishing, and that the bore thereof, as produced by the mandrel rod 42', is sufficiently accurate to need only a final sizing and rifling with a broach.

After the tubular forging has been separated from the throat material and the throat material retracted, the mandrel rod 42' may then be retracted through the die by applying pressure to piston 46', the piston 11' retracted, and the forging can be removed.

In case a tubular core is to be left in the tubular molding I then prefer to utilize cutoff plates 84 and 85, to remove plug 77 from rod 42 and run the tubular core through the interior of rod 42, through the die and then into rod 42'. This core then remains in place in the molded article, the tube being cut off by the shearing action of plates 84 and 85. For each new extrusion the core may be fed into the die through rod 42, either automatically or by hand.

The same machine with various temperature adjustments can accommodate all of the various results therein described on various types of gun or ordnance parts, such as gun barrels, brackets, bolts, etc., and also all manner of fittings for machines, automobiles, airplanes, boats of any description, as well as small apparatus or tools, surgical instruments, presses, motors, or manufacturing machines and electrical apparatus. The manufacture of shells and shell cases can be reduced in cost by the machine.

This machine, while it is described as hand controlled in operation, can be as easily made full or semi-automatic, and still accomplish the complete cycle of operation as required to execute the fabrication of the part as tooled.

My machine can handle pig material, cast or wrought bar, or pressed powder, or can be adapted for either pressed, molded, or cast blanks. It can also use cutout pieces of metal or material that has suitable specifications to permit the proper operation of the machine. When materials to be pressure-forged are molten, pressures can be reduced as compared with those required for extruding and molding plastic material. My machine and method is practical for all materials that are converted to a plastic up to 2000° F.

I claim:

1. The method of making a molded-extrusion which comprises heating said metal to a point just below a mushy plastic state thereof, additionally heating said metal to a refined mushy plastic stage by forcing said metal through a constricted orifice, and directing said mushy plastic metal immediately into a mold.

2. The method of making a molded-extrusion which comprises heating said metal to a point just below a mushy plastic state thereof, additionally heating said metal to a refined mushy plastic stage by forcing said metal through a constricted orifice, directing said mushy plastic metal immediately into a mold, and suddenly applying an additional pressure to the metal in the mold as freezing occurs.

3. Method in accordance with claim 2 wherein said first pressure is on the order of 50,000 pounds per square inch and said additional pressure is on the order of 200,000 pounds per square inch.

4. The method of making a molded-extrusion which comprises converting a solid mass of metal into mushy plastic condition by the simultaneous action of heat and pressure, forcing the mushy plastic metal immediately into a mold to the point of filling the same, permitting said metal to freeze, and applying a higher pressure to said metal as said metal freezes.

5. The method of making a molded-extrusion which comprises converting a solid mass of metal into plastic condition by the simultaneous action of heat and pressure, extruding the plastic metal into a mold to the point of filling the same, permitting said metal to freeze, and applying a higher, single pressure impact at a predetermined pressure to said metal as said metal freezes.

6. The method of plasticizing and simultaneously working a solid metal slug which comprises progressively extruding said slug through a reducing orifice to raise said metal at said orifice only to a mushy plastic temperature by applying pressure to the solid portion of said slug, and directing the extruded refined mushy plastic metal immediately into a mold.

CHARLES C. MISFELDT.